L. A. C. ST. PAUL DE SINCAY.
Manufacture of Sulphur.
No. 59,328. Patented Oct. 30, 1866.
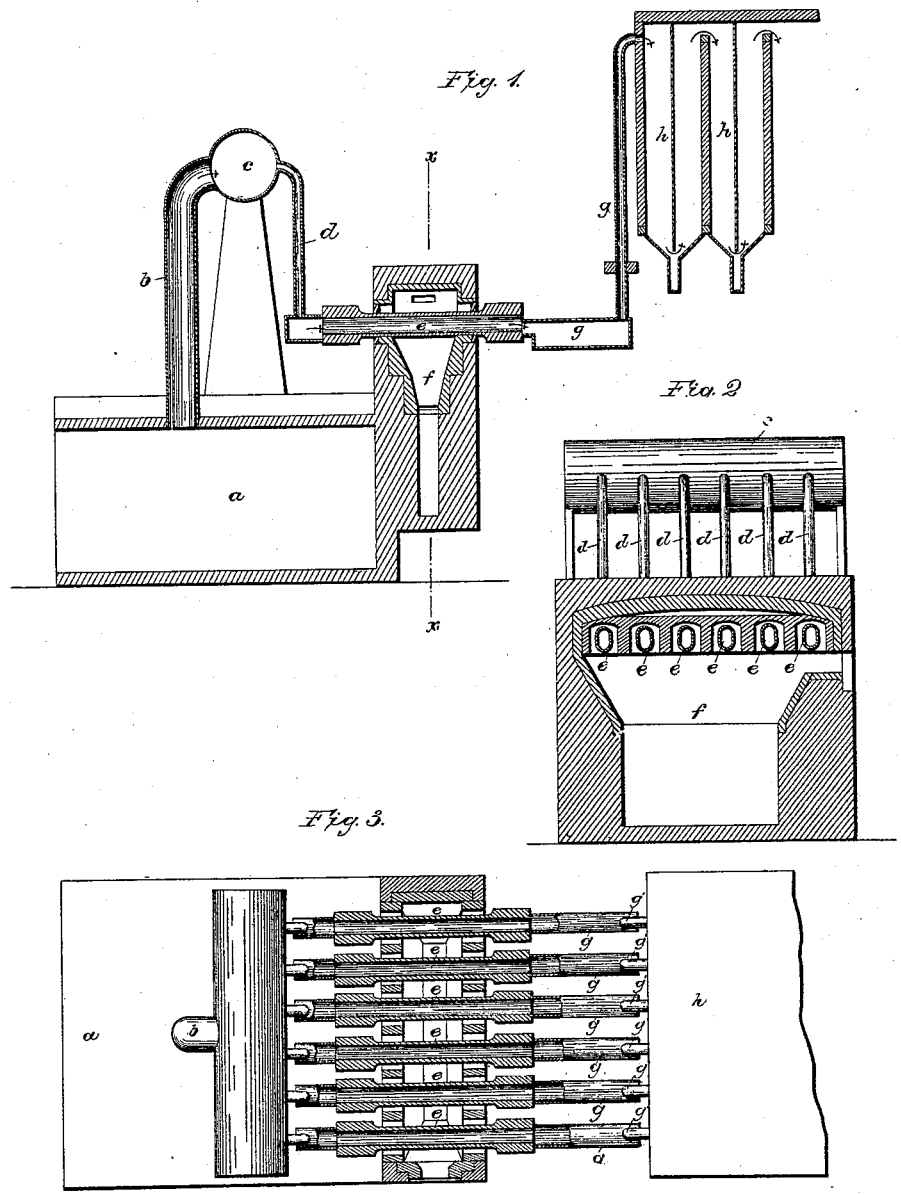

UNITED STATES PATENT OFFICE.

L. A. C. ST. PAUL DE SINCAY, OF LA VIEILLE MONTAGNE, BELGIUM.

IMPROVEMENT IN THE MANUFACTURE OF SULPHUR.

Specification forming part of Letters Patent No. 59,328, dated October 30, 1866.

*To all whom it may concern:*

Be it known that I, LOUIS ALEXANDER CALLEY ST. PAUL DE SINCAY, of La Vieille Montagne, of Chêne, Belgium, have invented a new and useful Improvement in the Manufacture of Sulphur; and I do hereby declare that the following is a full, clear, and exact description thereof, which will enable others skilled in the art to make and use the same, reference being had to the accompanying drawings, forming part of this specification, in which—

Figure 1 represents a longitudinal section of the apparatus which I use in carrying out my invention. Fig. 2 is a transverse section of the same, the line $x\,x$, Fig. 1, indicating the plane of section. Fig. 3 is a sectional plan or top view of the same.

Similar letters of reference indicate like parts.

The object of this invention is to manufacture sulphur by the reduction of sulphurous-acid gas, whereby, in the first place, a useful product is obtained, and, secondly, the noxious effect of the sulphurous-acid gas escaping from desulphurizing-furnaces and other manufactories is avoided.

The gases evolved during the process of roasting sulphureted ores contain a large percentage of sulphurous-acid gas, which is generally allowed to escape in the open atmosphere, to the great annoyance and injury of the neighborhood.

Instead of permitting these gases to escape in the open atmosphere, I conduct the same through the pipe $a$ to the reducing apparatus. This pipe connects through a series of pipes, $b$, with the receiver $c$, and from said receiver the gases are distributed through a series of tubes, $d$, each of which connects with one of the reducing-retorts $e$. These retorts are filled with coal, coke, or other refractory and absorbent material which has the property to reduce sulphurous acid, and they are situated over a grate, $f$, so that they can be heated to any desired degree without allowing their contents to come in direct contact with the fire.

The retorts $e$ connect with condensers $g$, which are made of sheet metal or any other suitable material, and connect by pipes $g$ with the sulphur-condensing chambers $h$. Said condensing-chambers are so arranged that the vapors or gases, in passing through them, are compelled to travel in a zigzag course, as indicated by the arrows in Fig. 1, and they are provided with cloth sifters, so that the sulphur is retained and separated from the gaseous products.

Thus, it will be seen, the separation of the sulphur from the gaseous products escaping from a desulphurizing-surface is effected by the action of heat in combination with incandescent coke, coal, peat, charcoal, or any material which is introduced into the retorts and heated while being shut off from the atmospheric air.

What I claim as new, and desire to secure by Letters Patent, is—

The within-described method of reducing sulphurous-acid gas, consisting of a series of retorts, $e$, condensers $g$, and collecting-chambers $h$, in combination with the main pipe $a$ and secondary pipes $b$, substantially as set forth.

ST. PAUL DE SINCAY.

Witnesses:
 A. GEOFFROY,
 L. HOCH.